T. B. THOMAS.
ANTISKIDDING DEVICE FOR AUTOMOBILES.
APPLICATION FILED JULY 5, 1912.
1,058,204.
Patented Apr. 8, 1913.
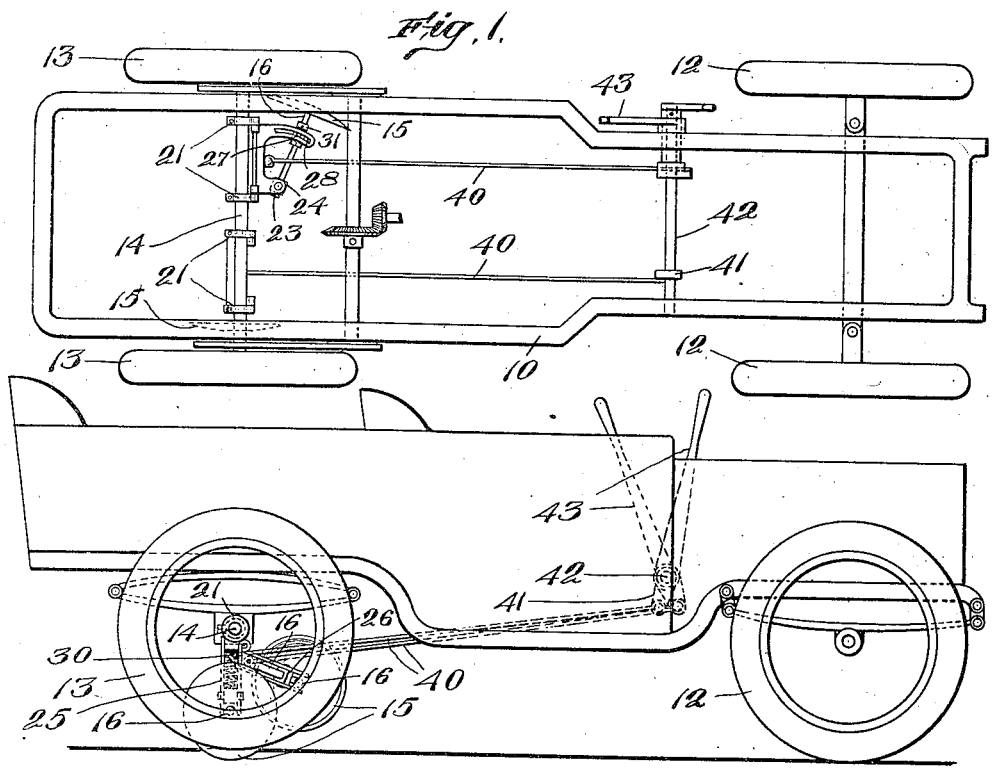
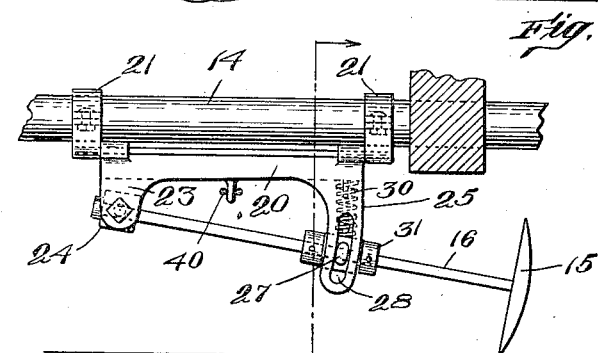
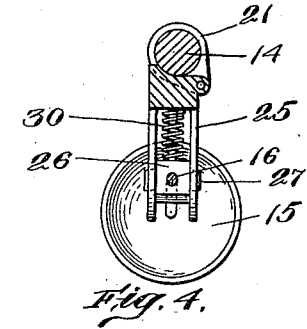
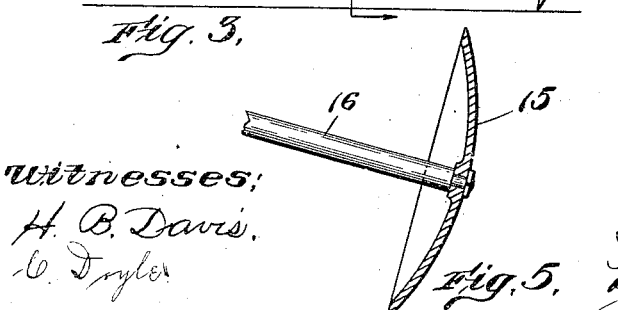
Witnesses:
H. B. Davis
C. Dryler
Inventor:
Theodore B. Thomas
By Noyes + Harriman.
attys.

UNITED STATES PATENT OFFICE.

THEODORE B. THOMAS, OF QUINCY, MASSACHUSETTS.

ANTISKIDDING DEVICE FOR AUTOMOBILES.

1,058,204.

Specification of Letters Patent.

Patented Apr. 8, 1913.

Application filed July 5, 1912. Serial No. 707,678.

*To all whom it may concern:*

Be it known that I, THEODORE B. THOMAS, a citizen of the United States, residing at Quincy, in the county of Norfolk and State of Massachusetts, have invented an Improvement in Antiskidding Devices for Automobiles, of which the following is a specification.

This invention relates to anti-skidding devices for automobiles and the like, and has for its object the provision of anti-skidding wheels, made as concavo-convex disks with sharp edges, adapted for movement into and out of engagement with the ground, said disks being arranged adjacent the traction-wheels of the automobile for effective operation and held against axial movement: and the invention also has for its object improved form of supports for said disks which admit of the disks rotating while in engagement with the ground, and of being supported in a yielding manner to admit of rising and falling to adjust themselves to inequalities of the surface of the ground, said supports being movable by means of hand-levers and intermediate connections, whereby the disks are moved into and out of engagement with the ground.

Figure 1 is a plan view of an anti-skidding device for automobiles embodying this invention. Fig. 2 is a side elevation of the device shown in Fig. 1. Fig. 3 is an enlarged front view of one of the anti-skidding disks and supporting-means therefor.
Fig. 4 is a transverse vertical section of the parts shown in Fig. 3. Fig. 5 is an enlarged vertical section of one of the antiskidding disks.

The frame 10, front-wheels 12, 12, rear traction-wheels 13, 13, arranged on an axle 14, are all intended to illustrate the corresponding parts of any ordinarily constructed automobile.

15 represents one of my improved antiskidding disks, it being here shown as a concavo-convex disk with a sharp edge adapted for engagement with the ground. Said disk is secured to a shaft 16, or it may be mounted rotatably on said shaft, so that it is free to rotate. The shaft 16 is borne by a suitable support arranged adjacent one of the traction-wheels, and, as here shown, a bracket 20 is pivotally connected to hangers 21, 21, arranged on the axle 14, and said bracket has a pair of arms 23, at one end which receive between them a block 24 which is pivotally connected to the arms, and said bracket has a pair of arms 25 at the other end which receive between them a block 26 having pins 27 at its opposite sides which enter slots 28 in the arms, thus admitting of a movement of the block corresponding to the length of the slot, said arms 25 acting as guiding means for the intermediate portion of the shaft. The block 26 is pressed downward by a spring 30, which latter exerts a yielding pressure thereupon. The disk-carrying shaft 16 extends through holes in both blocks 26 and 24, being rotatably mounted on said blocks and supported by them. Said shaft 16 is also held against axial movement in one direction by a collar 31, which is secured to it, and which engages the block 26. The supporting-means thus provided for the disk-carrying shaft permits said shaft to rotate and also to yield in an upward direction, so that the disk is permitted to rotate, and to rise and fall according to inequalities of the ground. Said bracket 20 is movable on its pivotal connections to move the disk into and out of engagement with the ground, and, as here shown, a link 40 is connected at one end to the bracket, its other end being connected to an arm 41, secured to a shaft 42, to which a hand-lever 43 is connected, so that movement of said hand-lever in one or the other direction rocks the shaft 42 and through the link operates to move the bracket 20 on its pivotal connections.

Normally, the device will be held with its disk out of engagement with the ground, but is adapted to be moved by the hand-lever into engagement with the ground at any time desired, and to be held as long as desired, and when in engagement with the ground is very effective to prevent the wheels from skidding.

In the preferred embodiment of my invention two antiskidding disks are employed, one adjacent each rear traction-wheel and separate levers are employed for operating said disks.

I claim:—

The anti-skidding device herein described, consisting of a pair of ground engaging devices, each comprising a shaft held against axial movement, a disk arranged on one end of said shaft, a swinging bracket, bearing-blocks for said shaft carried by said bracket, one of said blocks being pivotally connected to the bracket and the other slidably connected with the bracket and held against upward movement by a spring, and means connected with said brackets for swinging them.

In testimony whereof, I have signed my name to this specification, in the presence of two subscribing witnesses.

THEODORE B. THOMAS.

Witnesses:
B. J. Noyes,
H. B. Davis.